No. 661,862. Patented Nov. 13, 1900.
J. GERMAN.
MILK CAN.
(Application filed May 15, 1900.)
(No Model.)
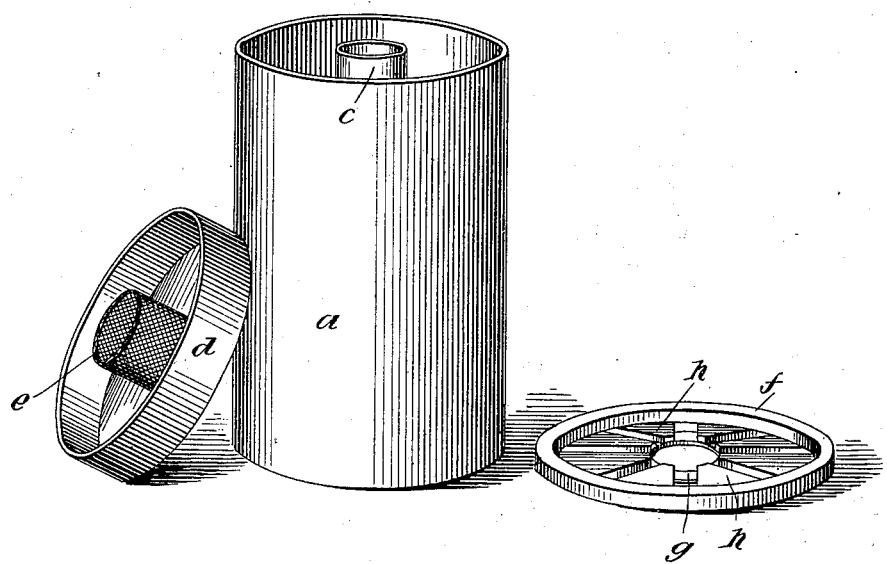
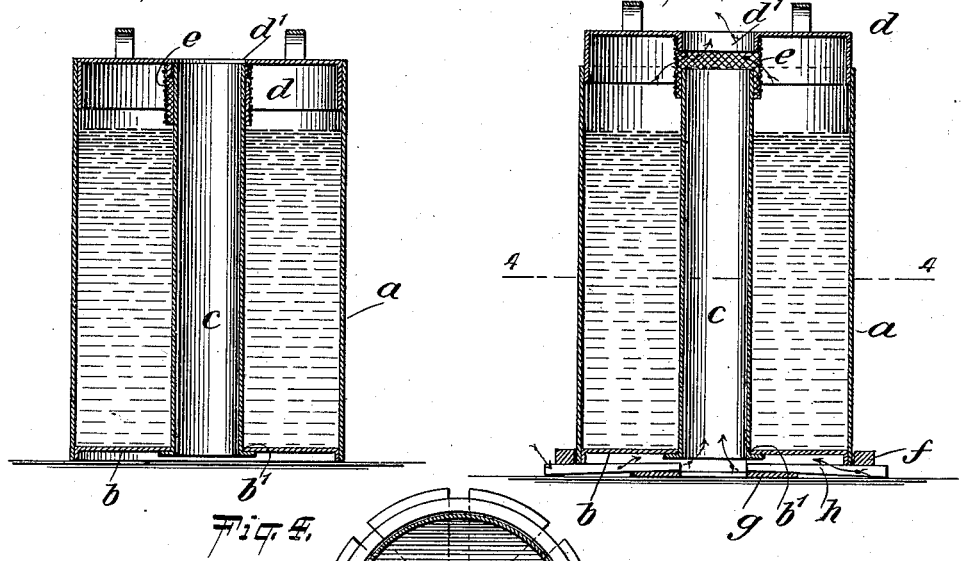
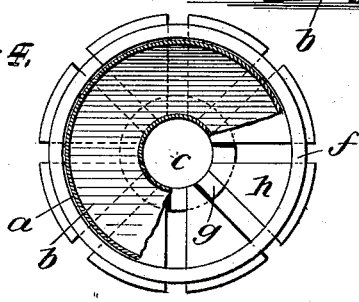
WITNESSES:
William P. Goebel.
J. B. Owens.
INVENTOR
John German.
BY
ATTORNEYS

UNITED STATES PATENT OFFICE.

JOHN GERMAN, OF AUBREY, WISCONSIN.

MILK-CAN.

SPECIFICATION forming part of Letters Patent No. 661,862, dated November 13, 1900.

Application filed May 15, 1900. Serial No. 16,750. (No model.)

*To all whom it may concern:*

Be it known that I, JOHN GERMAN, a citizen of the United States, and a resident of Aubrey, in the county of Richland and State of Wisconsin, have invented a new and Improved Milk-Can, of which the following is a full, clear, and exact description.

The purpose of this invention is to provide a milk-can which will insure the circulation of air around the milk and which will also tend to keep the milk cool, especially at the center of the body of milk.

This specification is the disclosure of one form of the invention, while the claim defines the actual scope thereof.

Reference is to be had to the accompanying drawings, forming a part of this specification, in which similar characters of reference indicate corresponding parts in all the views.

Figure 1 is a perspective view of the invention, showing the parts separated, the can being shown at the middle, the cover at the left, and the support or rest at the right. Fig. 2 is a vertical section of the invention. Fig. 3 is a similar view showing the can applied to the ventilating-rest; and Fig. 4 is a sectional plan view with parts broken away, the section being taken on the line 4 4 of Fig. 3.

The body $a$ of the can is joined to a bottom $b$, which is formed with a centrally-disposed opening $b'$, in which is fastened the lower end of a tube $c$, which passes up centrally through the can and has an open end approximately level with the open end of the can proper. A cover $d$ is provided for the can, the cover having a wide peripheral flange which is adapted to fit snugly inside of the body $a$. This cover is formed with a centrally-disposed orifice $d'$, registering with the tube $c$ and provided with a tubular screen $e$, which is projected downward and adapted to encircle the upper end of the tube $c$. When the cover $d$ is placed in the position shown in Fig. 2, the interior or milk-containing area of the can is hermetically sealed, and when the cover $d$ is raised to the position shown in Fig. 3 it is possible for the air to circulate between the cover $d$ and the tube $c$ and to pass into and out of the interior of the can, so as to thoroughly ventilate the milk therein. At all times the tube $c$ is open throughout its length, and the air may circulate freely through this tube to keep the interior of the can cool, and thus prevent the overheating of the milk in the center thereof.

When the milk is to be shipped, the cover $d$ is thrown down, as shown in Fig. 2, and when the milk-can is lying stationary the cover $d$ may be raised, as shown in Fig. 3. In order to further facilitate the cooling operation, I provide a rest for the can, which comprises an outer annular rim $f$ and an inner annular rim $g$, connected by segmental parts $h$, these parts being all rigidly attached and the outer rim $f$ serving to lie outside of the walls $a$ of the can, so that the bottom of the can rests on the segmental parts $h$. The air is now free to circulate between the parts $h$, under the bottom of the can, and up through the tube $c$. It will be observed that by this construction the greatest possible degree of circulation may be obtained.

Having thus described my invention, I claim as new and desire to secure by Letters Patent—

A milk-can having a tube passing therethrough from top to bottom, a cover having an opening registering with the tube and a tube projecting from the cover at the opening thereof and having sliding engagement with the tube on the can, a portion of said cover-tube being perforated and forming a screen, while the other portion of the cover-tube is imperforate, so that according to the position of the cover, the interior of the can is ventilated or not.

In testimony whereof I have signed my name to this specification in the presence of two subscribing witnesses.

JOHN GERMAN.

Witnesses:
GRANT A. GERMAN,
WM. H. PIER.